US012240236B2

(12) United States Patent
Miyazaki

(10) Patent No.: US 12,240,236 B2
(45) Date of Patent: Mar. 4, 2025

(54) HEAD, HEAD MODULE, LIQUID DISCHARGE APPARATUS, PRINTER, MODULE, AND APPARATUS

(71) Applicant: Takeshi Miyazaki, Kanagawa (JP)

(72) Inventor: Takeshi Miyazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 121 days.

(21) Appl. No.: 17/940,184

(22) Filed: Sep. 8, 2022

(65) Prior Publication Data

US 2023/0134389 A1 May 4, 2023

(30) Foreign Application Priority Data

Nov. 4, 2021 (JP) ................................ 2021-180704

(51) Int. Cl.
*B41J 2/14* (2006.01)

(52) U.S. Cl.
CPC ........ *B41J 2/14* (2013.01); *B41J 2002/14362* (2013.01); *B41J 2202/20* (2013.01)

(58) Field of Classification Search
CPC ................ B41J 2/14; B41J 2002/14362; B41J 2202/20; B41J 2/14233; B41J 2202/08; B41J 2202/12; B41J 25/34; B41J 2202/19
See application file for complete search history.

(56) References Cited

U.S. PATENT DOCUMENTS

| | | | |
|---|---|---|---|
| 2015/0266295 A1 | 9/2015 | Miyazaki | |
| 2017/0106650 A1 | 4/2017 | Miyazaki | |
| 2019/0263157 A1 | 8/2019 | Miyazaki | |
| 2020/0031148 A1 | 1/2020 | Miyazaki | |
| 2020/0298567 A1 | 9/2020 | Miyazaki | |
| 2021/0001652 A1 | 1/2021 | Kinokuni et al. | |
| 2021/0229443 A1 * | 7/2021 | Sugawara | B41J 2/14201 |

FOREIGN PATENT DOCUMENTS

| | | |
|---|---|---|
| JP | 58-158563 | 10/1983 |
| JP | 2010-280096 | 12/2010 |
| JP | 2020-006576 | 1/2020 |

* cited by examiner

*Primary Examiner* — Lisa Solomon

(74) *Attorney, Agent, or Firm* — Harness, Dickey & Pierce, P.L.C.

(57) ABSTRACT

A head includes: an attachment attached to a holder with a screw, the attachment having a through hole to which the screw is inserted, and the through hole having: a female screw having a valley and a crest; and a first concave having a diameter larger than a diameter of the valley of the female screw, the first concave opening toward the holder.

6 Claims, 16 Drawing Sheets

COMPARATIVE EXAMPLE 1

HEAD, HEAD MODULE, LIQUID DISCHARGE APPARATUS, PRINTER, MODULE, AND APPARATUS

CROSS-REFERENCE TO RELATED APPLICATIONS

This patent application is based on and claims priority pursuant to 35 U.S.C. § 119(a) to Japanese Patent Application No. 2021-180704, filed on Nov. 4, 2021, in the Japan Patent Office, the entire disclosure of which is hereby incorporated by reference herein.

BACKGROUND

Technical Field

Embodiments of this disclosure relate to a head, head module, liquid discharge apparatus, printer, module, and apparatus.

Related Art

To configure a head module (also referred to as a head unit, head array, etc.), multiple liquid discharge heads are attached to a base member (holder), for example.

For example, there is a head including a through hole to which a screw of a fixation screw is inserted and a seat part with which a screw head of the fixation screw is brought into contact. The fixation screw is inserted to the through hole and screwed to a female screw of a support member so that the head is fixed to the support member.

SUMMARY

A head includes: an attachment attached to a holder with a screw, the attachment having a through hole to which the screw is inserted, and the through hole having: a female screw having a valley and a crest; and a first concave having a diameter larger than a diameter of the valley of the female screw, the first concave opening toward the holder.

A head module includes: a holder; a head attached to the holder; and a screw fixing the head to the holder. The head includes: an attachment having a through hole to which the screw is inserted, the through hole includes: a female screw having a valley and a crest; and a first concave having a diameter larger than a diameter of the valley of the female screw, the first concave opening toward the holder, and the screw includes: a screw head; a male screw at a tip of the screw; and a shaft between the screw head and the male screw and narrower than a diameter of the crest of the female screw.

A module includes: a first member; a second member; and a screw fixing the first member to the second member. The first member includes: an attachment having a through hole to which the screw is inserted, the through hole includes: a female screw having a valley and a crest; and a first concave having a diameter larger than a diameter of the valley of the female screw, the first concave opening toward the second member, and the screw includes: a screw head; a male screw at a tip of the screw; and a shaft between the screw head and the male screw and narrower than a diameter of the crest of the female screw.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
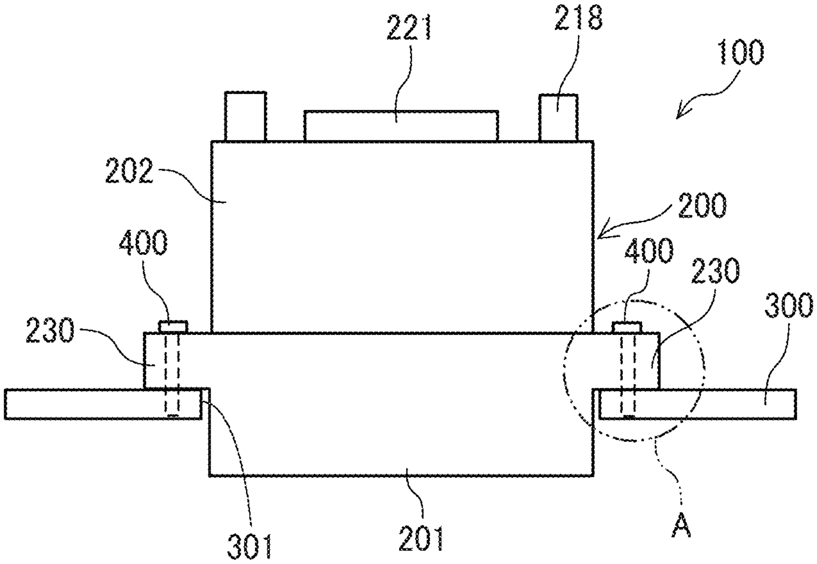
FIG. 1 is an explanatory diagram of a head a head module according to the first embodiment of the present embodiment along the longitudinal direction of the head.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

Hereinafter, an explanation will be given of the embodiments of the present embodiment with reference to the accompanying drawings.

The first embodiment of the present embodiment is described below with reference to FIG. 1 through FIG. 3C.

FIG. 1 is an explanatory diagram of a head and head module 100 according to the embodiment along the longitudinal direction of the head.

Figure 2:
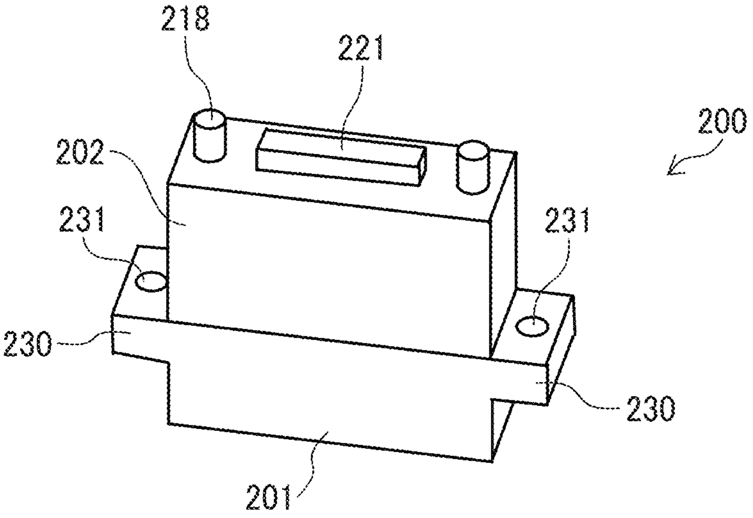
FIG. 2 is an explanatory diagram of an external perspective view of an example of the head.

FIG. 2 is an explanatory diagram of an external perspective view of an example of a head 200.

Figure 3A:
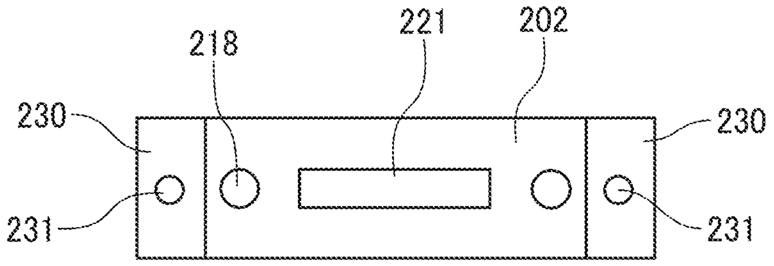
FIG. 3A to FIG. 3C are explanatory diagrams of the head.
Figure 3B:
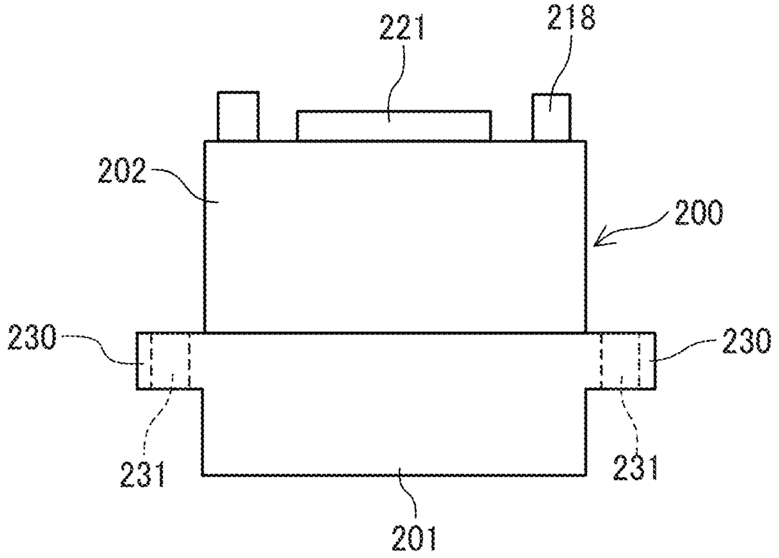
Figure 3C:
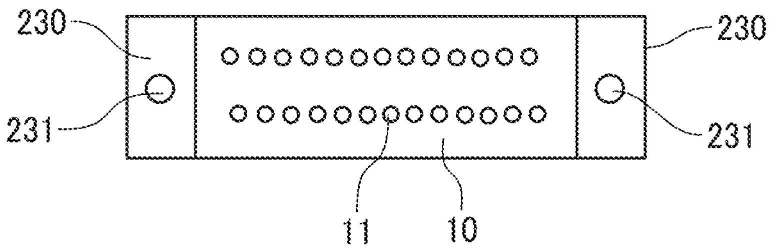

FIG. 3A to FIG. 3C are explanatory diagrams of the head 200.

The head module 100 as the module includes the head 200, i.e., one or more (only one of the head 200 is illustrated in the drawing) first members, which are liquid discharge heads 200 that discharge liquid, and the holder 300, i.e., the second member such as a mounting plate to which the head 200 is attached.

The head 200 includes the base 201 and the cover 202.

The base 201 includes the nozzle plate 10 in which the nozzles 11 are formed, an individual channel member (actuator substrate) including an individual channel plate formed with pressure chambers and the like leading to the nozzles 11 and a diaphragm plate integrally formed with piezoelectric elements, a common channel member formed as a common channel leading to the multiple pressure chambers, etc.

The cover 202 covers the port member 218 that supplies the liquid to the base 201.

The connector part 221, to which a wiring member for the piezoelectric elements is connected, is disposed on the upper part of the cover 202.

The base 201 includes the attachments 230 as flanges at both ends in the longitudinal direction.

The holder 300 includes the opening 301 with which the head 200 is engaged.

Further, the base 201 of the head 200 is engaged with the opening 301 of the holder 300, and the head 200 is fixed and attached to the holder 300 with the screws 400 inserted to the attachments 230 of the head 200.

Next, the attachment mechanism for the head and the holder in the head module 100 according to the first embodiment is described below with reference to FIG. 4 and FIG. 5.

Figure 4:
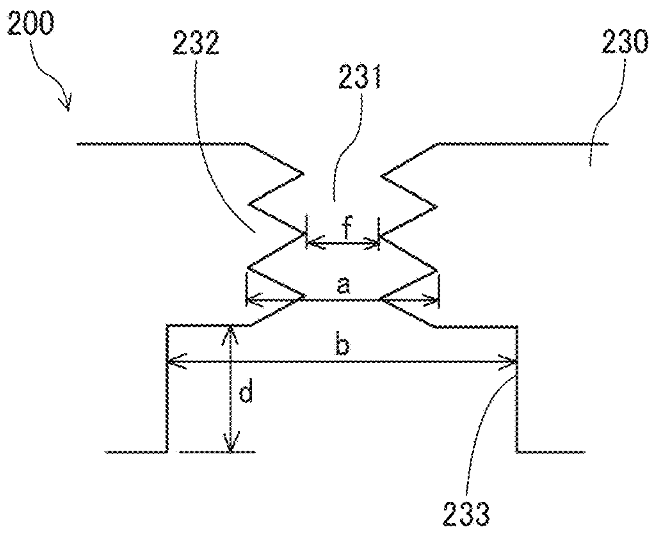
FIG. 4 is an explanatory diagram for a cross section of an attachment of the head in the embodiment.

FIG. 4 is an explanatory diagram for a cross section of an attachment 230 of the head 200.

Figure 5:
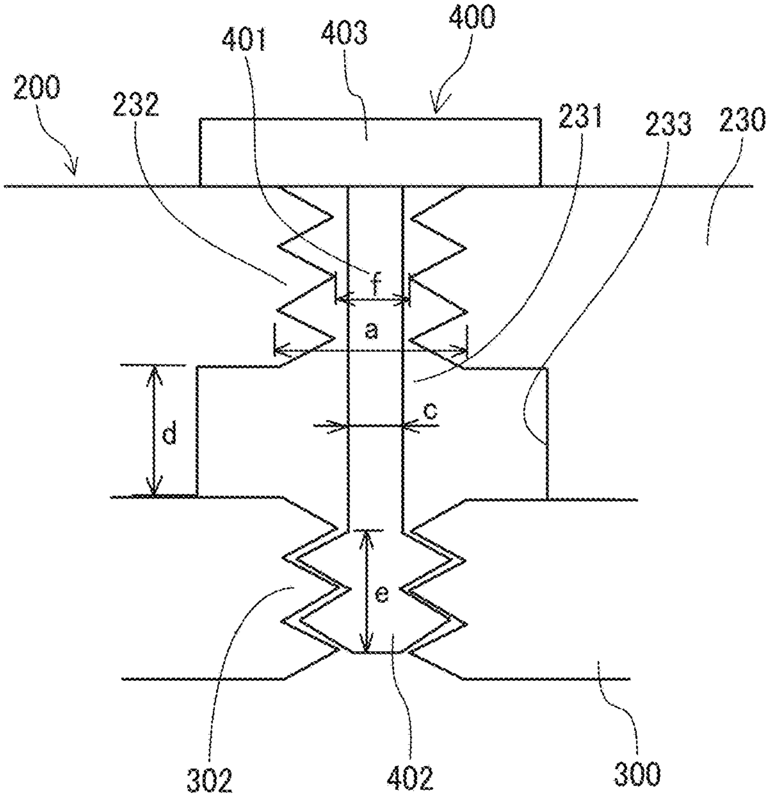
FIG. 5 is an explanatory diagram for a cross section of a part of an attachment mechanism for the head and a holder corresponding to the A part of FIG. 1.

FIG. 5 is an explanatory diagram for a cross section of a part of the attachment mechanism for the head 200 and the holder 300 corresponding to the A part of FIG. 1.

The attachment 230 of the head 200 includes the through hole 231 to which the screw 400 is inserted. The through hole 231 includes the female screw 232, into which the screw 400 can be screwed, and the first concave 233 (hole part), which opens toward the holder 300 side. The first concave 233 has a diameter "b" that is larger than the diameter "a" of a valley of the female screw 232 (a>b). The holder 300 side is the downstream side (forward side) in the insertion direction of the screw 400. The female screw 232 has the valley and a crest.

Note that, in the present embodiment, the section other than the female screw 232 in the through hole 231 is the first concave 233. Further, although the through hole 231 has a round hole shape in the present embodiment, the through hole 231 is not limited to a round hole and may have a polygonal shape.

The holder 300 includes the female screw 302 into which the screw 400 is screwed.

The female screw 232 of the head 200 and the female screw 302 of the holder 300 have the same screw shape. Note that, as long as the screw 400 can be screwed to pass through the female screw 232 of the head 200, the female screw 232 need not have the same shape as the female screw 302 of the holder 300.

Regarding the screw 400, a male screw 402 is formed only at the tip part of the shaft 401. Regarding the shaft 401, the outer diameter c of the section having no screw below the screw head 403 to the male screw 402 is smaller than the diameter a of the valley of the female screw 232 of the head 200 (c<a). Accordingly, the shaft 401 of the screw 400 can pass through the female screw 232 of the head 200.

The shaft 401 has a diameter smaller than the diameter a of the crest of the female screw 232 of the head 200 (c<f) as illustrated in FIG. 5. The diameter c of the valley of the female screw 232 is an outer diameter of the female screw 232. The diameter f of the crest of the female screw 232 is an inner diameter of the female screw 232.

The depth (height) d from the surface of the first concave 233 of the head 200 is longer than the length e of the male screw 402 of the screw 400 (d>e).

Figure 6A:
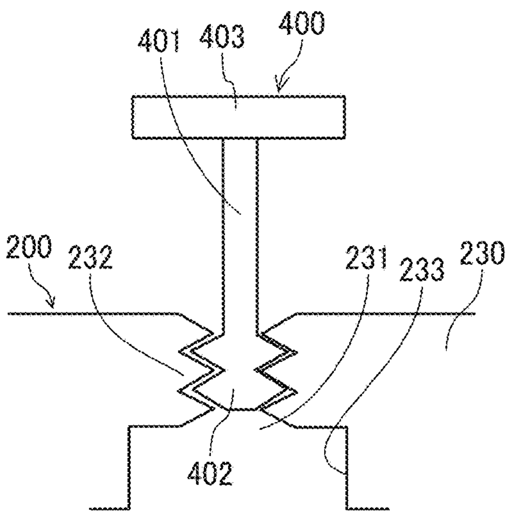
FIG. 6A and FIG. 6B are explanatory diagrams for a cross section in a state where a screw is attached to a through hole of the head, which is provided for the explanation of the function of the embodiment.
Figure 6B:
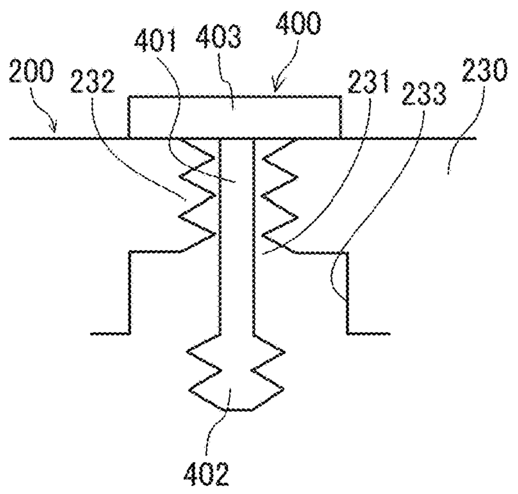
Figure 7:
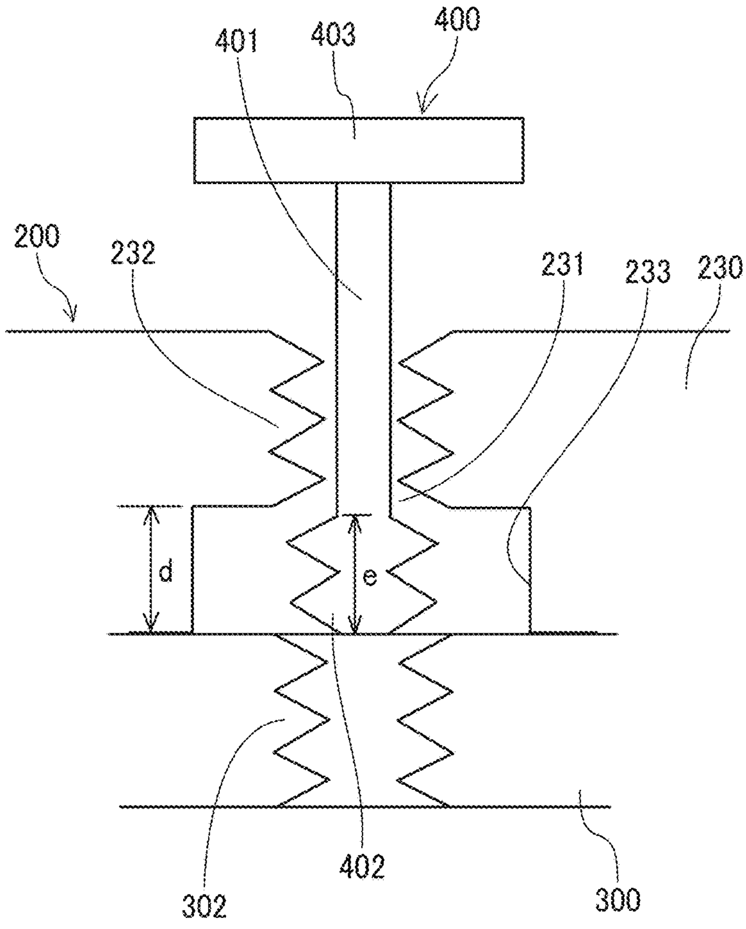
FIG. 7 is also an explanatory diagram for a cross section in a state where the head is placed on the holder.
Figure 8:
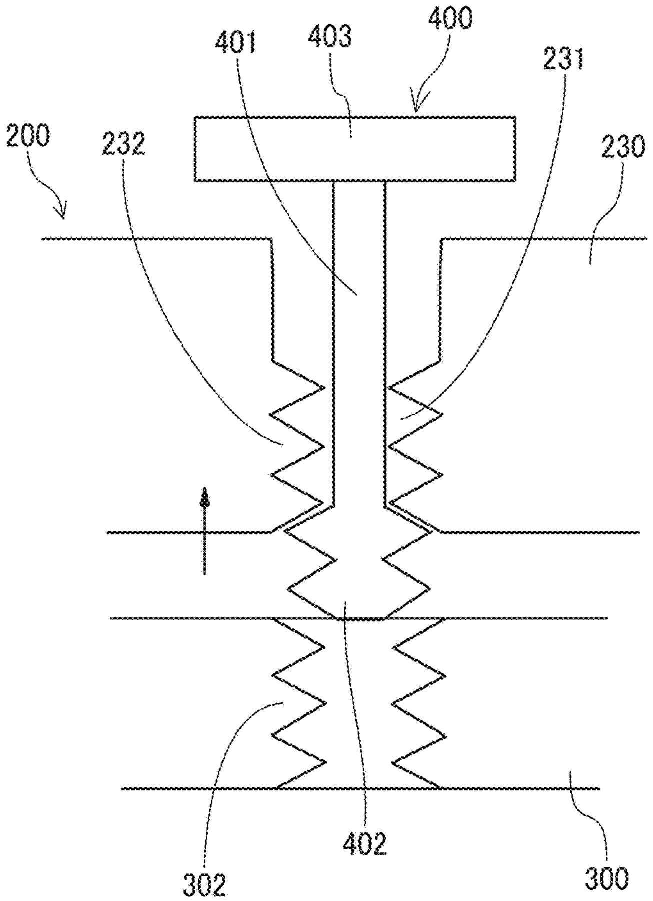
FIG. 8 is an explanatory diagram for a cross section, which is provided for the explanation of the comparative example 1.

Next, the function of the present embodiment is described below with reference to FIG. 6A through FIG. 8 as well. FIG. 6A and FIG. 6B are explanatory diagrams for a cross section in a state where a screw is attached to a through hole of the head, and FIG. 7 is an explanatory diagram for a cross section in a state where the head is placed on the holder. FIG. 8 is an explanatory diagram for a cross section, which is provided for the explanation of the comparative example 1.

When the head 200 is fixed and attached to the holder 300, the screw 400 is inserted to the through hole 231 of the head 200 in advance. Here, as illustrated in FIG. 6A, the male screw 402 of the screw 400 is screwed to the female screw 232 of the through hole 231.

Alternatively, as illustrated in FIG. 6B, the male screw 402 of the screw 400 is screwed to pass through the female screw 232 of the through hole 231.

Further, the head 200 is placed on the holder 300 and the male screw 402 of the screw 400 is screwed to the female screw 302 of the holder 300 and fixed, so that the head 200 is attached on the holder 300.

In this way, the screw 400 for fixation to the head 200 is screwed to the female screw 232 of the through hole 231 or passes through the through hole 231 and cannot be pulled out because of the female screw 232, the screw 400 is prevented from falling out of the head 200.

Accordingly, the workability of the work of attaching the head 200 to the holder 300 with the screw 400 is improved.

Here, the through hole 231 of the head 200 includes the first concave 233 that opens toward the holder 300 side, and the depth d of the first concave 233 is longer than the length e of the male screw 402 of the screw 400.

Accordingly, since the male screw 402 is accommodated inside the first concave 233 when the head 200 is placed on the holder 300 and the male screw 402 of the screw 400 has passed through the female screw 232 of the through hole 231, the head 200 is prevented from being lifted up, and thus the workability is improved.

On the other hand, in a case where the through hole 231 does not have the first concave that opens toward the holder 300 side as in the comparative example 1 illustrated in FIG. 8, the screw 400 move in a direction opposite to the holder 300 when the male screw 402 of the screw 400 has passed through the female screw 232 of the through hole 231. Therefore, the head 200 is lifted up against the holder 300 in an unstable manner, which reduces workability.

Next, the second embodiment of the present embodiment is described below with reference to FIG. 9 and FIG. 10.

Figure 9:
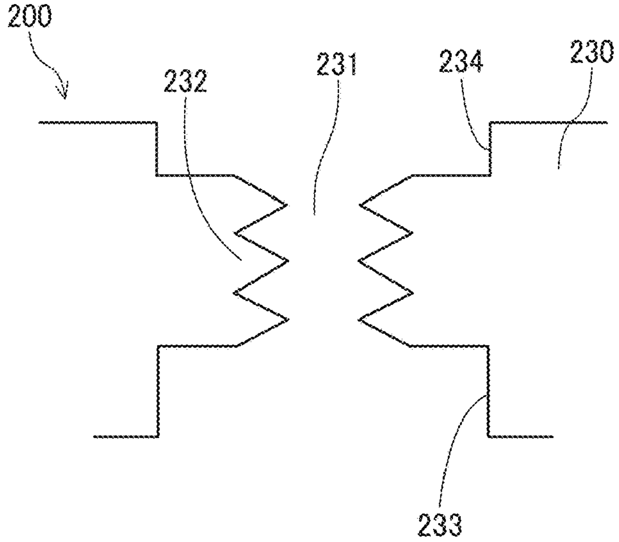
FIG. 9 is an explanatory diagram for a cross section of an attachment of the head according to the second embodiment of the present embodiment.

FIG. 9 is an explanatory diagram for a cross section of an attachment 230 of the head 200 according to the second embodiment.

Figure 10:
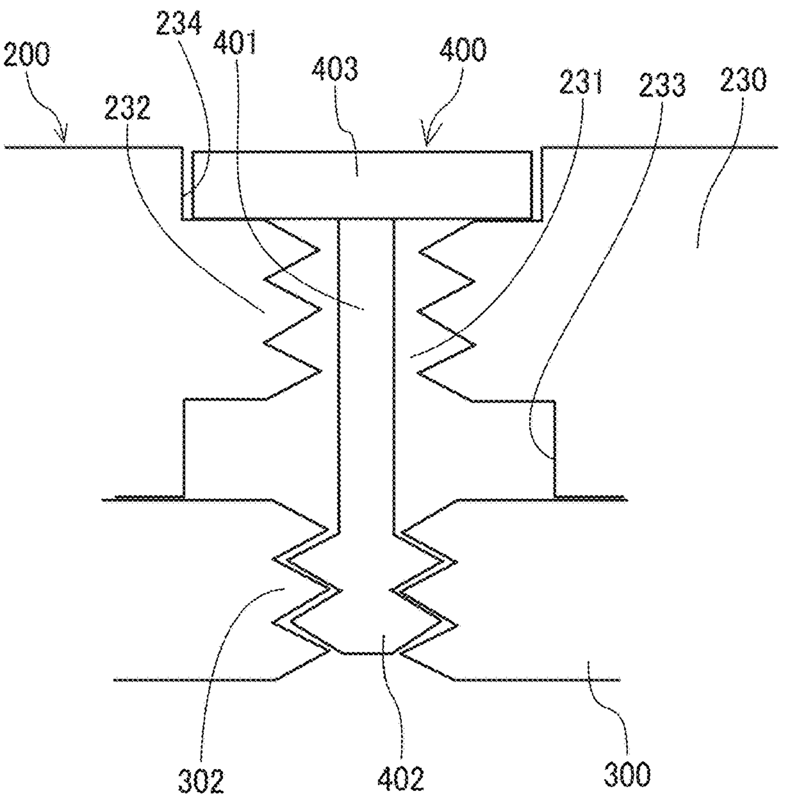
FIG. 10 is an explanatory diagram for a cross section of a part of the attachment mechanism for the head and the holder in the head module according to the embodiment.

FIG. 10 is an explanatory diagram for a cross section of a part of the attachment mechanism for the head 200 and the holder 300 in the head module 100 according to the embodiment.

The attachment 230 of the head 200 includes the through hole 231 to which the screw 400 is inserted. The through hole 231 includes the female screw 232, into which the screw 400 can be screwed, the first concave 233 (hole part), which opens toward the holder 300 side with a diameter that is larger than the diameter a of the valley of the female screw 232, and the second concave 234 (hole part), which opens toward a side opposite to the holder 300. The second concave 234 has a diameter larger than a diameter a of the valley of the female screw 232.

The second concave 234 of the present embodiment is a counterbored hole for accommodating the screw head 403 of the screw 400.

With such a configuration, as illustrated in FIG. 10, the screw head 403 of the screw 400 is accommodated in the second concave 234 so as not to protrude from the attachment 230 when the head 200 is fixed and attached to the holder 300 with the screw 400.

Next, the third embodiment of the present embodiment is described below with reference to FIG. 11 and FIG. 12.

Figure 11:
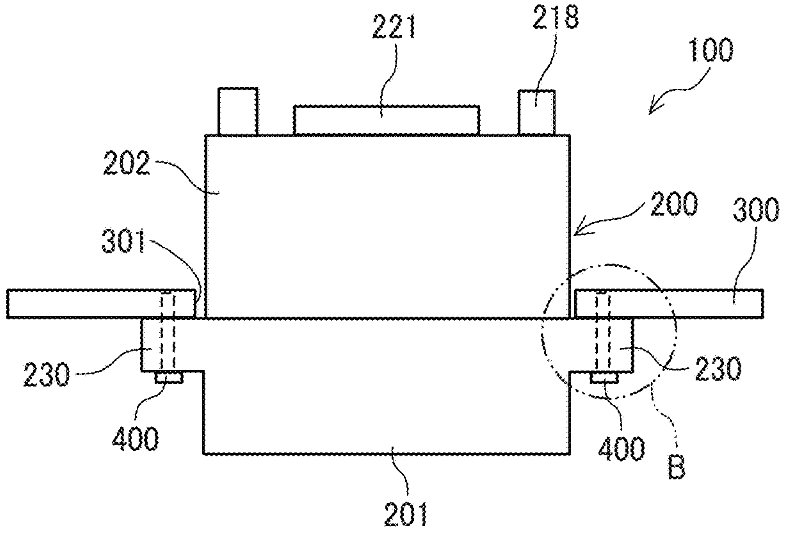
FIG. 11 is an explanatory diagram of the head module of the third embodiment of the present embodiment along the longitudinal direction of the head.

FIG. 11 is an explanatory diagram of the head module 100 according to the third embodiment along the longitudinal direction of the head.

Figure 12:
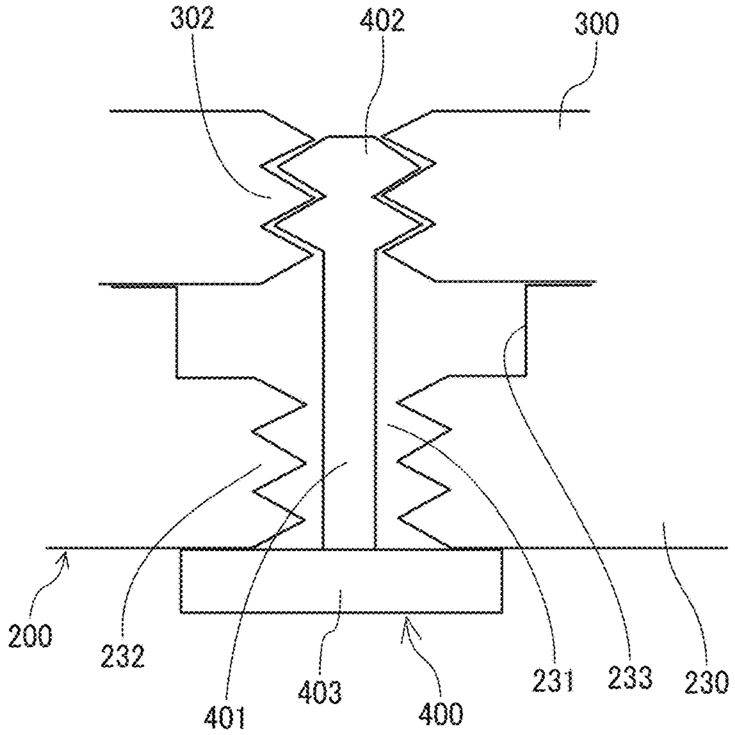
FIG. 12 is an explanatory diagram for a cross section of a part of the attachment mechanism for the head and the holder corresponding to the B part of FIG. 11.

FIG. 12 is an explanatory diagram for a cross section of a part of the attachment mechanism for the head 200 and the holder 300 corresponding to the B part of FIG. 11.

In the present embodiment, the attachments 230 of the head 200 are fixed and attached on the lower surface side of the holder 300.

Here, the through hole 231 of the attachment 230 of the head 200 is the same as in the first embodiment described above.

Next, the fourth embodiment of the present embodiment is described below with reference to FIG. 13.

Figure 13:
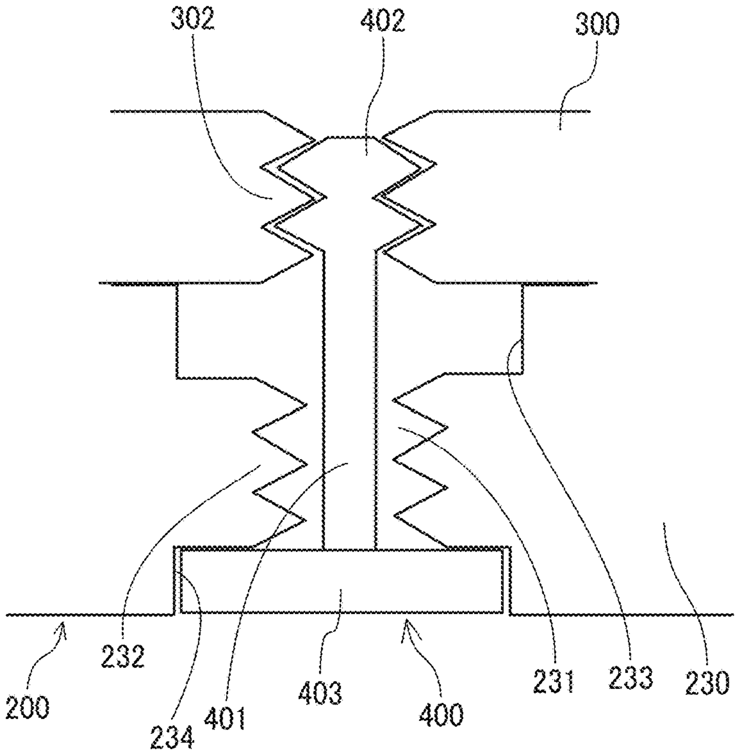
FIG. 13 is an explanatory diagram for a cross section of a part of the attachment mechanism for the head and the holder in the head module according to the fourth embodiment of the present embodiment.

FIG. 13 is an explanatory diagram for a cross section of a part of the attachment mechanism for the head 200 and the holder 300 in the head module 100 according to the fourth embodiment.

In the present embodiment, the attachment 230 of the head 200 is fixed and attached to the lower surface side of the holder 300.

Here, the through hole 231 of the attachment 230 of the head 200 is the same as in the second embodiment described above.

Next, the fifth embodiment of the present embodiment is described below with reference to FIG. 14.

Figure 14:
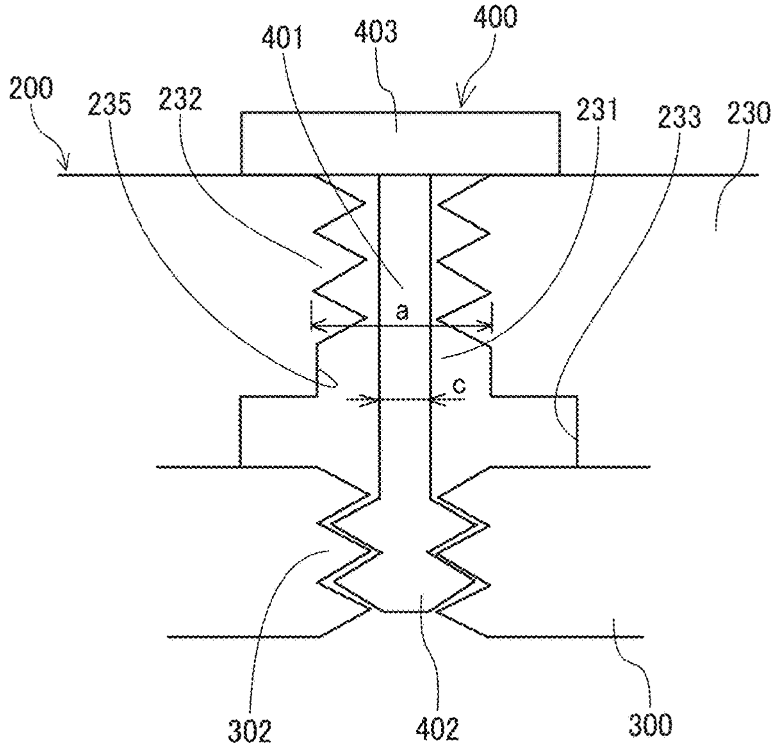
FIG. 14 is an explanatory diagram for a cross section of a part of the attachment mechanism for the head and the holder in the head and head module according to the fifth embodiment of the present embodiment.

FIG. 14 is an explanatory diagram for a cross section of a part of the attachment mechanism for the head 200 and the holder 300 according to the fifth embodiment.

In the present embodiment, the through hole 231 of the attachment 230 of the head 200 includes the third concave 235 (hole part) having the same diameter (including the same and a larger diameter with a tolerance) as the diameter a of the valley of the female screw 232 between the female screw 232 and the first concave 233.

In this way, even with the third concave 235 having the same diameter as the diameter a of the valley of the female screw 232, since the diameter c of the shaft 401 of the screw 400 is smaller than the diameter a of the valley of the female screw 232, the shaft 401 of the screw 400 can pass through the section of the third concave 235.

Accordingly, when the male screw 402 of the screw 400 has passed through the female screw 232 of the through hole 231, the inclination of the screw 400 can be reduced.

Next, the sixth embodiment of the present embodiment is described below with reference to FIG. 15.

Figure 15:
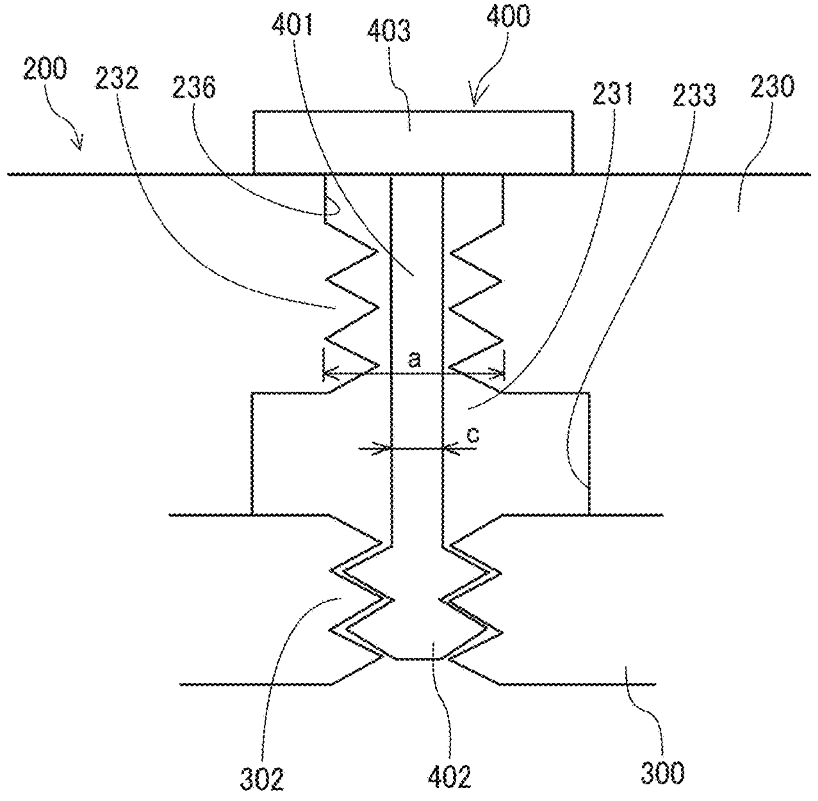
FIG. 15 is an explanatory diagram for a cross section of a part of the attachment mechanism for the head and the holder in the head and head module according to the sixth embodiment of the present embodiment.

FIG. 15 is an explanatory diagram for a cross section of a part of the attachment mechanism for the head 200 and the holder 300 according to the sixth embodiment.

In the present embodiment, the through hole 231 of the attachment 230 of the head 200 includes the fourth concave 236 (hole part) disposed opposite to the holder 300. That is, the fourth concave 236 is disposed opposite to a side of the first concave 233 with the female screw 232 in between (disposed opposite side of the first concave 233 with respect to the female screw 232).

The fourth concave 236 has the same diameter (including the same and a larger diameter with a tolerance) as the diameter a of the valley of the female screw 232. The fourth concave 236 faces the screw head 403 of the screw 400. The female screw 232 is between the first concave 233 and the fourth concave 236.

In this way, even with the fourth concave 236 having the same diameter as the diameter a of the valley of the female screw 232, since the diameter c of the shaft 401 of the screw 400 is smaller than the diameter a of the valley of the female screw 232, the shaft 401 of the screw 400 can pass through the section of the fourth concave 236.

Accordingly, when the male screw 402 of the screw 400 is inserted to the through hole 231, the male screw 402 can be guided by the fourth concave 236 to the female screw 232, and thus the workability at the time of inserting the screw 400 to the through hole 231 of the attachment 230 is improved.

Next, the seventh embodiment of the present embodiment is described below with reference to FIG. 16 and FIG. 17A to FIG. 17C.

Figure 16:
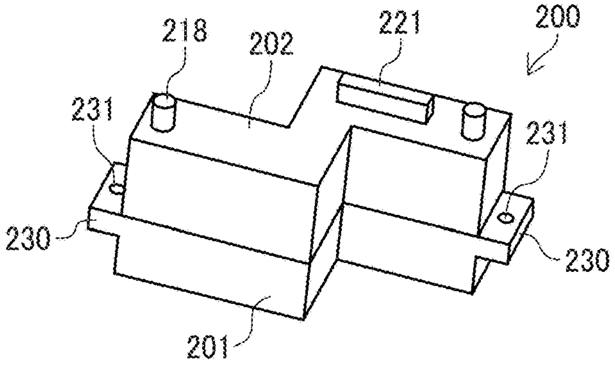
FIG. 16 is an explanatory diagram for an external perspective view of the head according to the seventh embodiment of the present embodiment.

FIG. 16 is an explanatory diagram of an external perspective view of the head 200 according to the present embodiment.

Figure 17A:
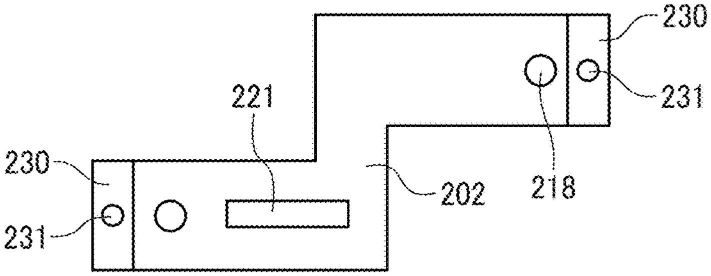
FIG. 17A to FIG. 17C are explanatory diagrams of the head.
Figure 17B:
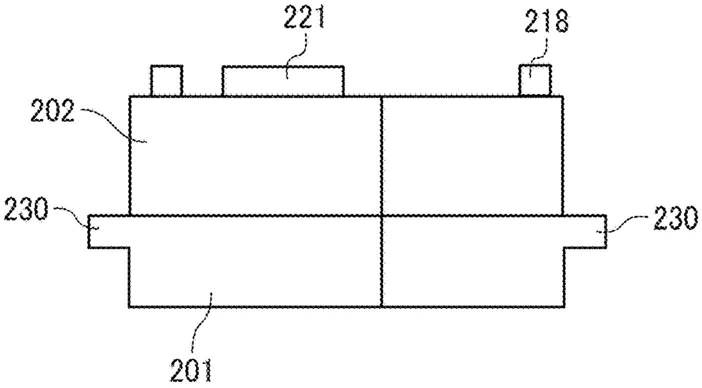
Figure 17C:
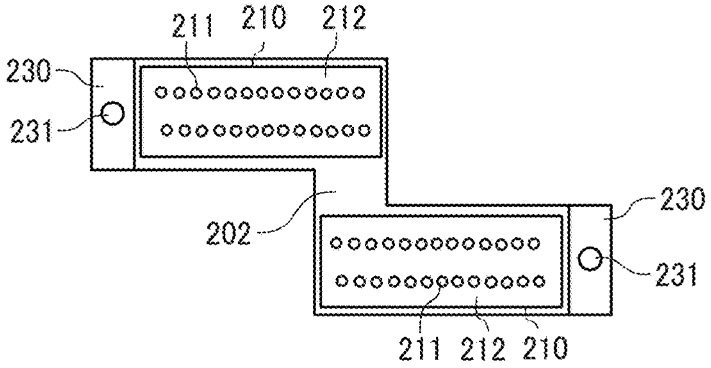

FIG. 17A to FIG. 17C are explanatory diagrams of the head 200.

The head 200 of the present embodiment includes the two screw heads 210, the base 201 on which the screw heads 210 are disposed in a staggered manner, and the cover 202 that covers the port member 218, etc., for the base 201.

Each screw head 210 of the base 201 includes the nozzle plate 212 in which the nozzles 211 are formed, an individual channel member (actuator substrate) including an individual channel plate formed with pressure chambers and the like leading to the nozzles 211 and a diaphragm plate integrally formed with piezoelectric elements, a common channel member formed as a common channel communicating with the multiple pressure chambers, etc.

Further, the base 201 includes the attachments 230 as flanges at both ends in the longitudinal direction, and the attachments 230 include the through holes 231 as described in each of the embodiments described above.

Next, the eighth embodiment of the present embodiment is described below with reference to FIG. 18.

Figure 18:
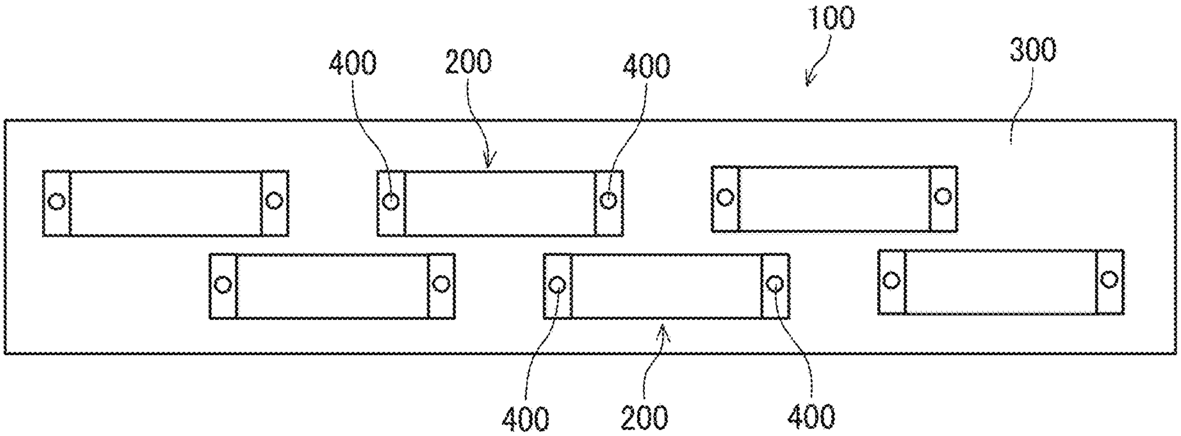
FIG. 18 is a planar explanatory diagram of the head module according to the eighth embodiment of the present embodiment.

FIG. 18 is a planar explanatory diagram of the head module according to the embodiment.

In the head module 100 of the present embodiment, the multiple heads 200 described in the above-described first embodiment are disposed in a staggered manner on the holder 300. The attachments 230 of each head 200 can be include the through holes 231 described in each of the above embodiments.

In this way, when the multiple heads 200 are disposed side by side, since it is possible to hold the screws 400 in the through holes 231 of the heads 200 in advance, the heads 200 can be easily fixed and attached to the holder 300 with the screws 400 even in a small workspace.

Figure 19:
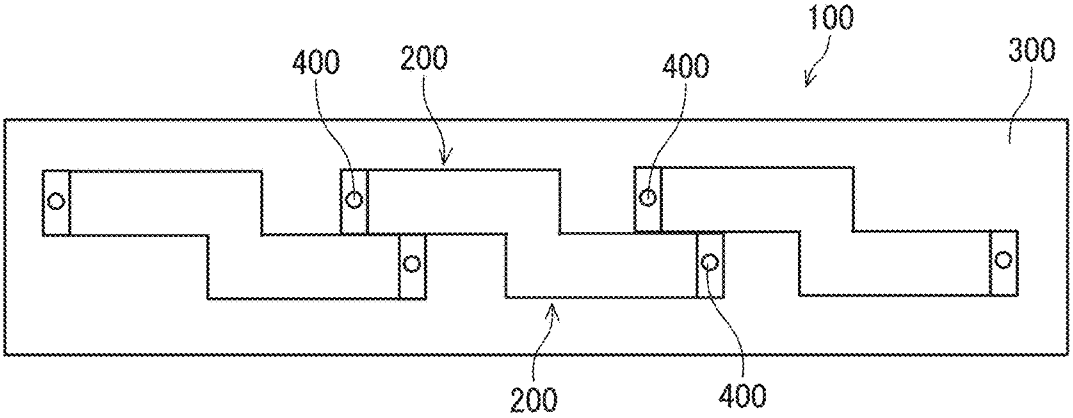
FIG. 19 is a planar explanatory diagram of the head module according to the ninth embodiment of the present embodiment.

Next, the ninth embodiment of the present embodiment is described below with reference to FIG. 19. FIG. 19 is a planar explanatory diagram of the head module according to the embodiment.

In the head module 100 of the present embodiment, the multiple heads 200 described in the above-described seventh embodiment are disposed in a staggered manner on the holder 300. The attachments 230 of each head 200 may include the through holes 231 described in each of the embodiments described above.

In the present embodiment, although the workspace is smaller than in the eighth embodiment described above, since it is possible to hold the screws 400 in the through holes 231 of the heads 200 in advance, the heads 200 can be easily fixed and attached to the holder 300 with the screws 400.

Figure 20:
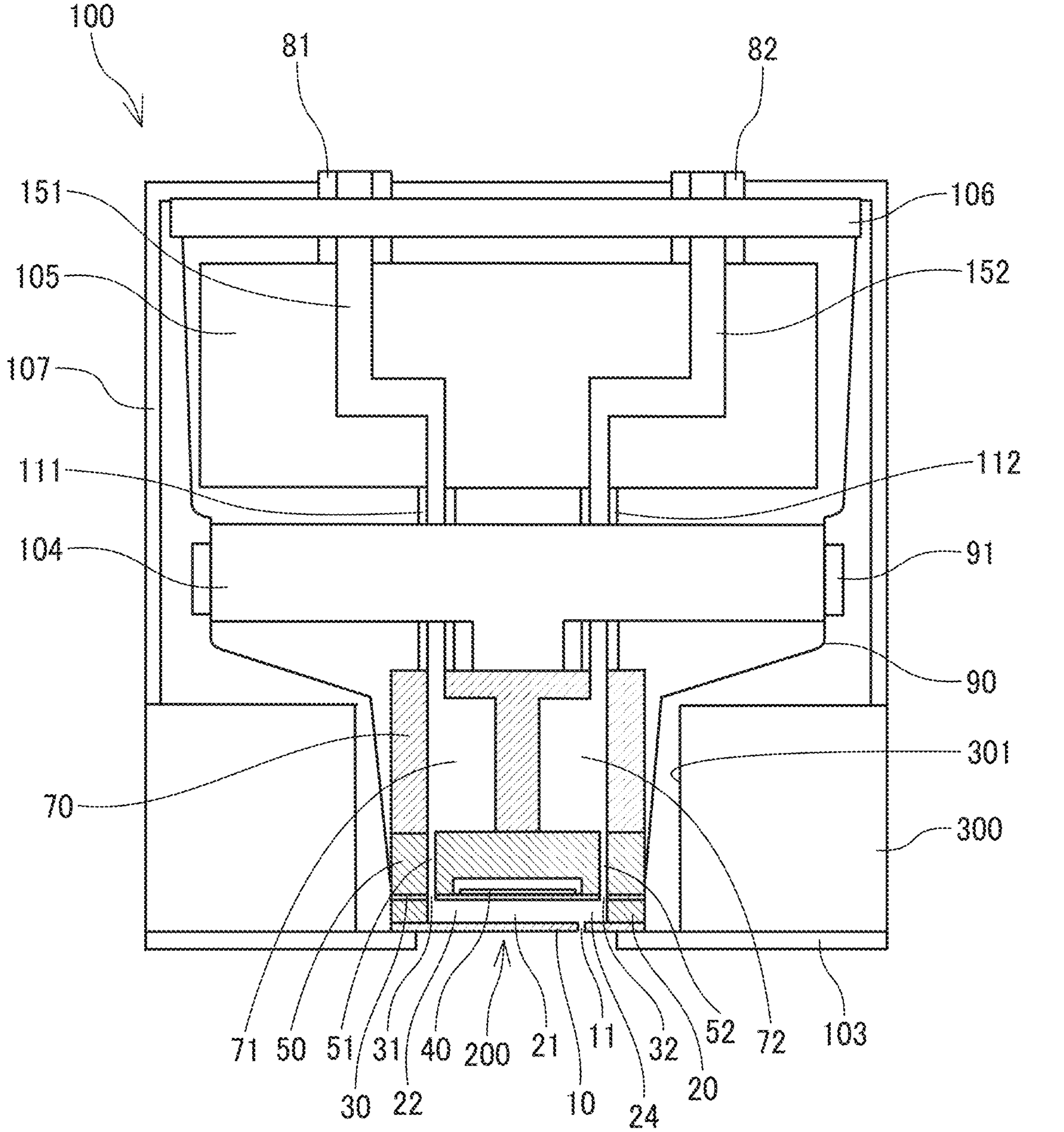
FIG. 20 is an explanatory diagram for a cross section of the head module of the tenth embodiment of the present embodiment along the lateral direction of the head.
Figure 21:
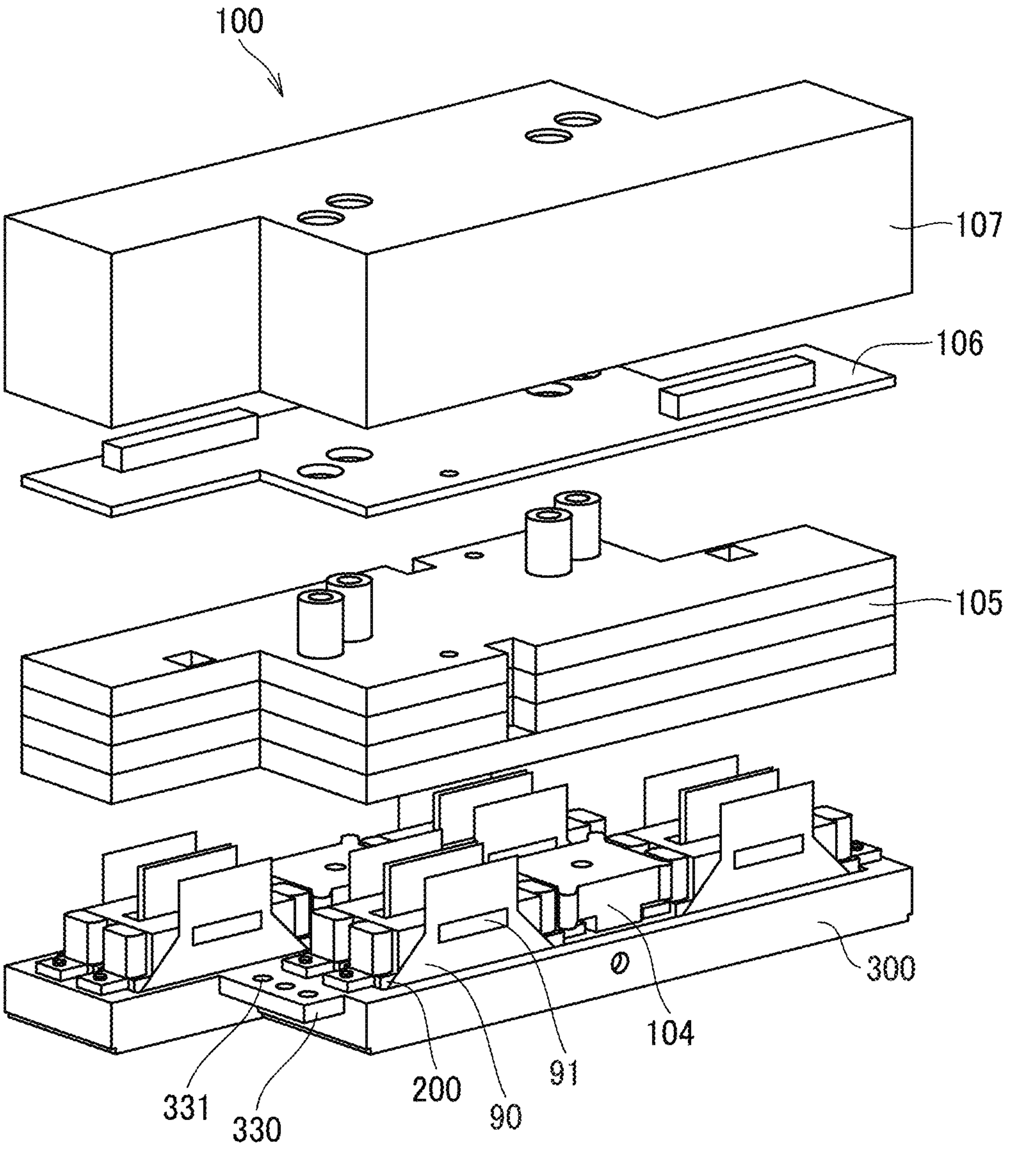
FIG. 21 is an explanatory diagram for an exploded perspective view of the head module.
Figure 22:
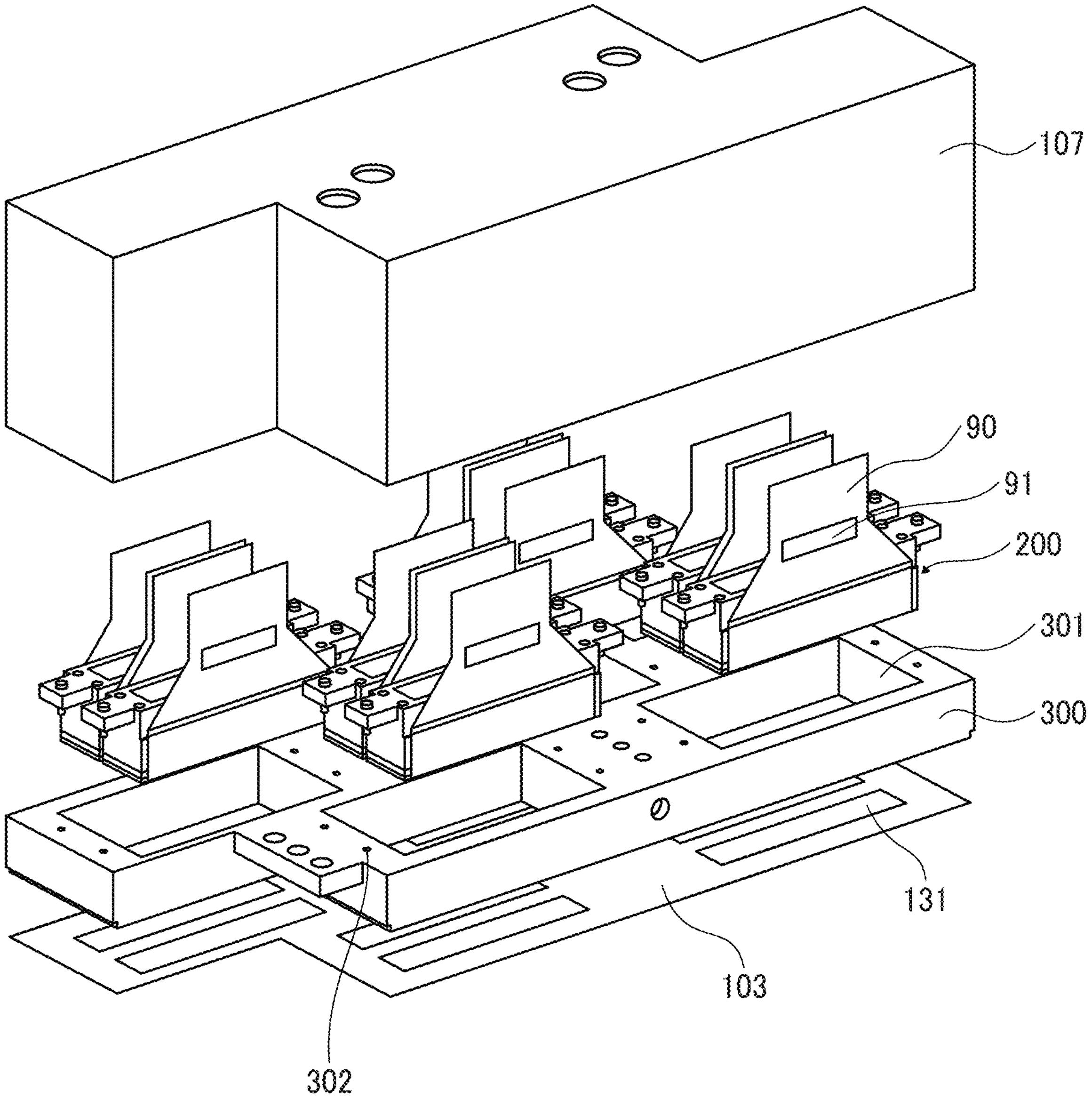
FIG. 22 is an explanatory diagram for an exploded perspective view of the head module.
Figure 23:
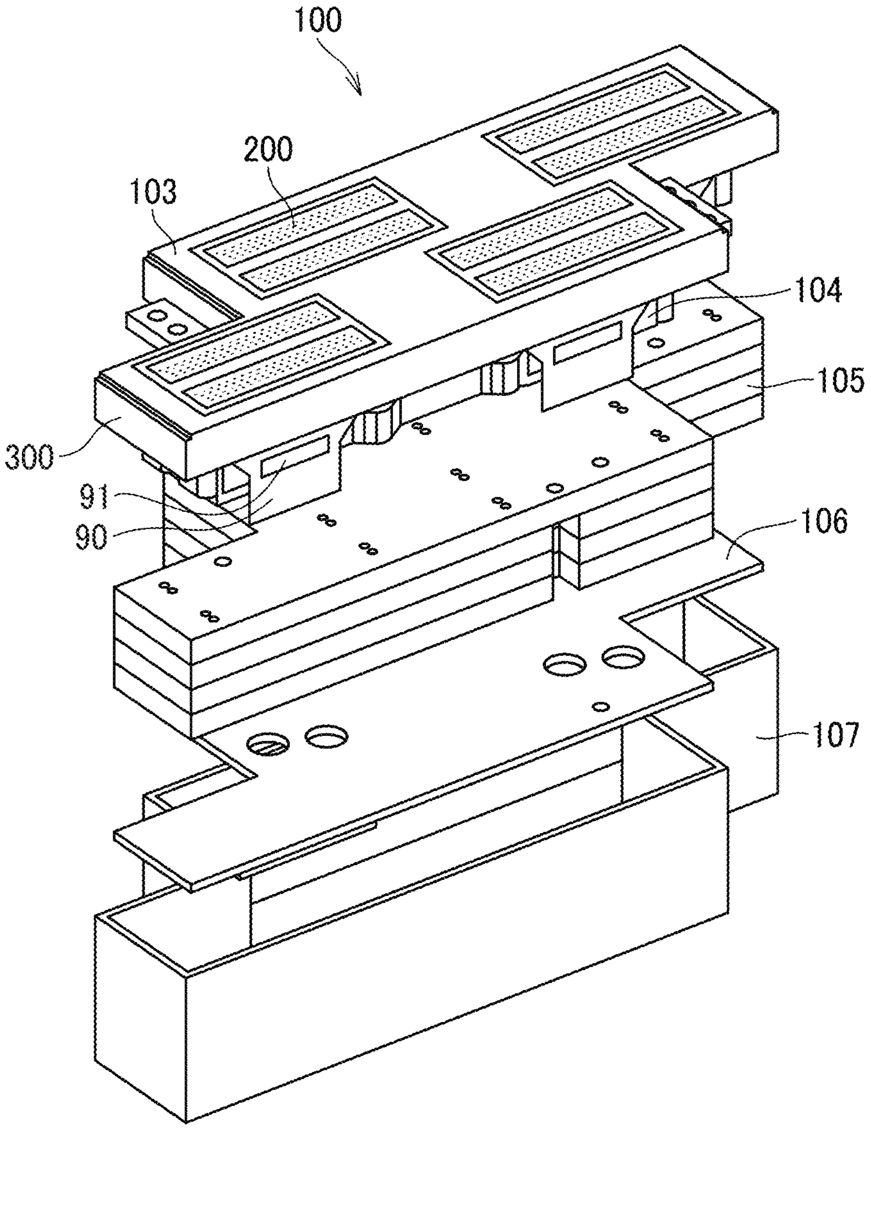
FIG. 23 is an explanatory diagram for an exploded perspective view from the nozzle surface side of the head module.

Next, the tenth embodiment of the present embodiment is described below with reference to FIG. 20 through FIG. 23. FIG. 20 is an explanatory diagram for a cross section of the head module according to the embodiment along the lateral direction of the head, FIG. 21 and FIG. 22 are explanatory diagrams for exploded perspective views of the head module, and FIG. 22 is an explanatory diagram for an exploded perspective view from the nozzle surface side of the head module.

The head module 100 includes the multiple heads 200, which are liquid discharge heads that discharge liquid, the holder 300, the nozzle cover member 103, the heat-radiation member 104, the manifold 105, the printed circuit board 106 (PCB), and the module case 107.

The heads 200 are circulation type heads, which include the nozzle plate 10 in which the nozzle 11 is formed, the individual channel plate 20 formed with the pressure chamber 21 leading to the nozzle 11, etc., the diaphragm plate 30 including the piezoelectric element 40, the intermediate channel plate 50 stacked on the diaphragm plate 30, the common channel member 70 stacked on the intermediate channel plate 50, etc.

Together with the pressure chamber 21, the individual channel plate 20 forms the supply side individual channel 22 leading to the pressure chamber 21 and the collection side individual channel 24 leading to the pressure chamber 21.

The intermediate channel plate 50 forms the supply side intermediate individual channel 51 leading to the supply side individual channel 22 via the opening 31 of the diaphragm plate 30 and the collection side intermediate individual channel 52 leading to the collection side individual channel 24 via the opening 32 of the diaphragm plate 30.

The common channel member 70 forms the supply side common channel 71 leading to the supply side intermediate individual channel 51 and the collection side common channel 72 leading to the collection side intermediate individual channel 52. The supply side common channel 71 leads to the supply port 81 via the channel 151 of the manifold 105. The collection side common channel 72 leads to the collection port 82 via the channel 152 of the manifold 105.

The printed circuit board 106 and the piezoelectric element 40 are connected via the flexible wiring member 90, and the driver IC (drive circuit) 91 is mounted on the flexible wiring member 90. The driver IC 91 is thermally coupled to the heat-radiation member 104.

The head 200 is inserted to the opening 301 formed in the holder 300 and is fixed by joining the peripheral edge part of the individual channel plate 20 to the nozzle cover member 103, which is joined and fixed to the holder 300.

Further, the attachments 230 formed in the common channel member 70 are fixed to the holder 300 with the screws 400.

Further, the holder 300 includes the attachments 330 at two positions, and the attachments 330 include the through holes 331.

As with the through holes 231 of the head 200 described in each of the above-described embodiments, these through holes 331 are configured to have a female screw and the first concave, which opens toward the holder that holds this head module 100 and has a diameter larger than the diameter of the valley of the female screw.

Next, an example of the liquid discharge apparatus according to the present embodiment is described below with reference to FIG. 24 and FIG. 25.

Figure 24:
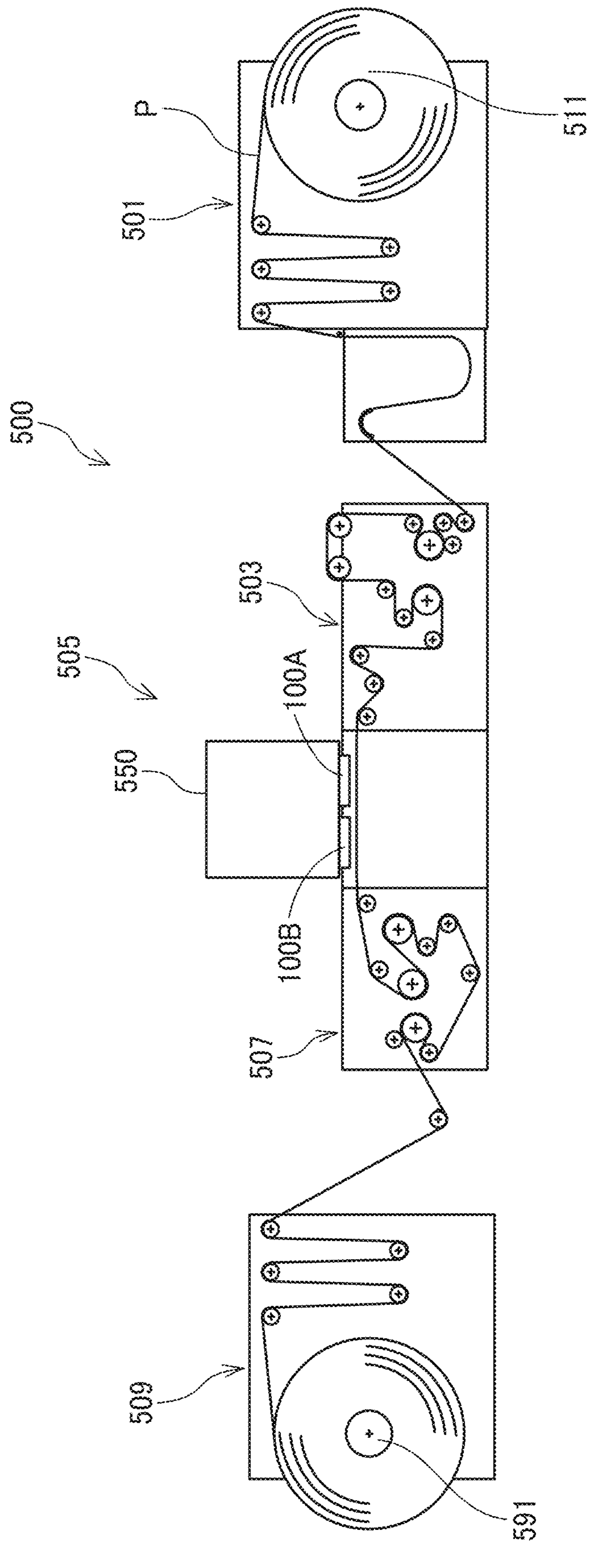
FIG. 24 is a schematic explanatory diagram of an example of the liquid discharge apparatus according to the present embodiment.
Figure 25:
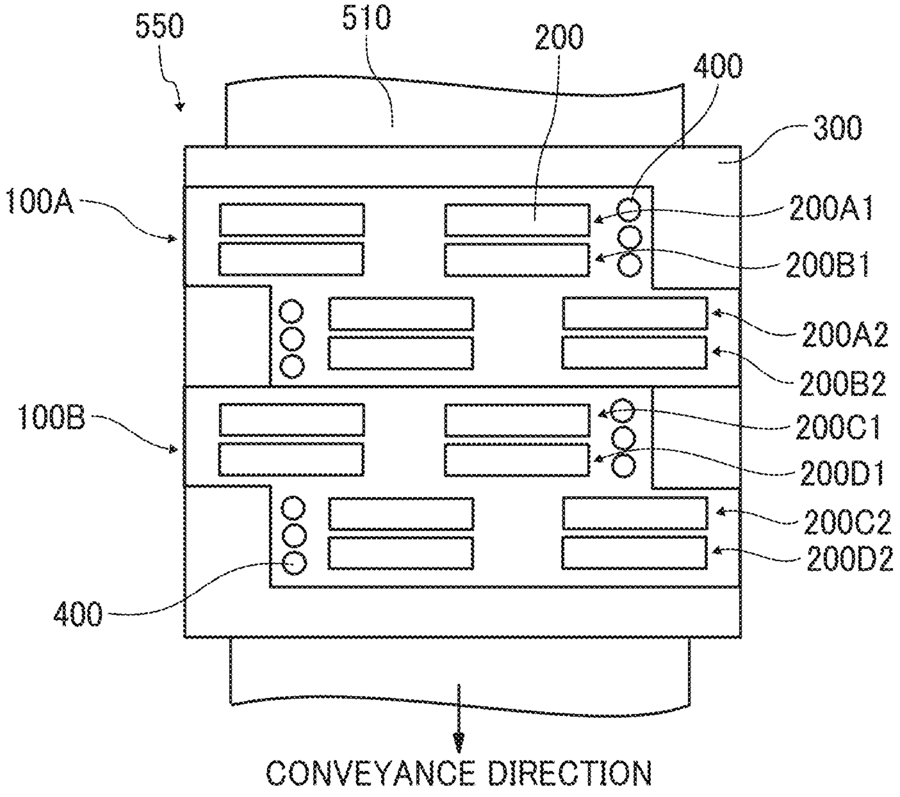
FIG. 25 is a planar explanatory diagram of an example of the discharge unit of the apparatus.

FIG. 24 is a schematic explanatory diagram of the apparatus, and FIG. 25 is a planar explanatory diagram of an example of the discharge unit of the apparatus.

The printer 500, which is an apparatus corresponding to the liquid discharge apparatus, includes the installation unit 501 that installs the continuous body 510, the guide/conveyance unit 503 that guides and conveys the continuous body 510 to the printing unit 505, such as continuous ledger paper or a continuous sheet installed by the installation unit 501, the printing unit 505 that performs printing by discharging liquid to the continuous body 510 to form an image, the drying unit 507 that dries the continuous body 510, the ejection unit 509 that ejects the continuous body 510, etc.

The continuous body 510 is fed from the wound roller 511 of the installation unit 501, guided and conveyed by the respective rollers of the installation unit 501, the guide/conveyance unit 503, the drying unit 507, and the ejection unit 509, and wounded by the winder roller 591 of the ejection unit 509.

In the printing unit 505, this continuous body 510 is conveyed in such a manner facing the discharge unit 550, so that an image is printed with the liquid discharged from the discharge unit 550.

As illustrated in FIG. 24, the discharge unit 550 includes the two head modules described in the above-described tenth embodiment, i.e., the head module 100A and head module 100B, in the holder 300 common to the head module 100A and head module 100B.

Here, the head modules 100 are fixed and attached to the holder 300 with the screws 400 through the through holes 331 formed in the head modules 100.

Note that, with respect to the head arrangement direction, which is the direction in which the heads 200 are arranged in the head modules 100 and is the direction perpendicular to the conveyance direction, the head rows 200A1 and 200A2 of the head module 100A discharge liquid of the same color. Similarly, the head rows 200B1 and 200B2 of the head module 100A are paired, the head rows 200C1 and 200C2 of the head module 100B are paired, and the head rows 200D1 and 200D2 are paired, so as to discharge liquid of the respective colors as desired.

Note that the head modules according to the present embodiment can be integrated with functional components and mechanisms, so as to configure the liquid discharge unit. For example, the head modules can be combined with at least one of a head tank, carriage, supply mechanism, maintenance/recovery mechanism, main-scanning movement mechanism, and configurations of a liquid circulation apparatus.

Here, the term "integrate" includes, for example, that a head module and functional components or mechanisms are fastened, joined, engaged, etc., so as to be fixed to each other or so that one is held with the other in a movable manner. Further, the head module and the functional components or mechanisms may be configured to be removable from each other.

Further, the "liquid discharge apparatus" in the present embodiment includes an apparatus including a head, head module, or liquid discharge units to discharge liquid by driving the liquid discharge head.

The liquid discharge apparatus includes, not only an apparatus that can discharge liquid to an object to which liquid can be attached, but also a liquid discharge apparatus into gas or liquid.

The "liquid discharge apparatus" can include a means relating to the feeding, conveying, and ejecting of an object to which liquid can be attached, and, moreover, a pre-processing apparatus, a post-processing apparatus, and the like.

For example, the "liquid discharge apparatus" may be an image forming apparatus, which is an apparatus that discharges ink to form an image on a sheet, or a stereoscopic modeling apparatus (three-dimensional modeling apparatus) that discharges a modeling liquid onto a powdery material layer, which is formed by layering powdery material, in order to produce a stereoscopic modeled object (three-dimensional modeled object).

Further, the "liquid discharge apparatus" is not limited to a liquid discharge apparatus for visualizing meaningful images such as letters and figures. For example, an apparatus that forms a pattern and the like that does not have meaning by itself and an apparatus that produces a three-dimensional model are included.

The above-mentioned "object to which liquid can be attached" is indicative of an object to which liquid can be attached at least temporarily, an object to which liquid can be attached and fixed, an object to which liquid can be attached and permeate, etc. Unless otherwise specified, anything that liquid can be attached to is included, and specific examples include media to be recorded such as sheets, record paper, record sheets, films, and cloths, electronic components such as electronic substrates and piezoelectric elements, and other media such as powdery material layers (powder layers), organ models, and cells for inspection.

The material of the aforementioned "object to which liquid can be attached" may be anything to which liquid can be attached at least temporarily, such as paper, yarn, fiber, fabric, leather, metals, plastics, glass, wood, and ceramics.

Further, although the "liquid discharge apparatus" is an apparatus in which the liquid discharge head moves relative to the object to which liquid can be attached, there is not a limitation as such. Specific examples include a serial type apparatus which moves the liquid discharge head, a line type apparatus which does not move the liquid discharge head, etc.

Further, in addition, the "liquid discharge apparatus" may be a processing liquid applying apparatus that discharges a processing liquid onto a sheet in order to apply the processing liquid onto the sheet surface for a purpose of improving the quality of the sheet surface, etc., a spray granulation apparatus that sprays a composition liquid having raw materials dispersed inside of the liquid through a nozzle to granulate fine particles of the raw material, etc.

Although the liquid to be discharged is not limited in particular and can be anything that has a viscosity and a surface tension suitable for being discharged from the head, it is preferable to use a liquid whose viscosity becomes 30 mPa·s or less by heating or cooling under a normal temperature and normal pressure.

More specifically, the liquid may be a solution, a suspension, an emulsion, or the like including a solvent such as water or an organic solvent, a colorant such as a dye or a pigment, a functionalization material such as a polymerizable compound, a resin, or a surfactant, a biocompatible material such as DNA, amino acid, protein, or calcium, an edible material such as a natural colorant, etc., and, for example, these can be used for the purposes of an inkjet ink, a surface treatment solution, a liquid for forming a constituent element of an electronic element or a light-emitting element or a resist pattern of an electronic circuit, or a material solution for three-dimensional modeling.

The energy generating source for discharging liquid includes ones using a piezoelectric actuator (laminated type piezoelectric element or thin film type piezoelectric element), a thermal actuator which uses an electricity-heat conversion element such as a heating resistor, an electrostatic actuator configured with a diaphragm plate and counter electrodes, etc.

Note that, among the terms of the present application, terms such as image forming, recording, letter printing, photo printing, printing, and modeling are synonyms.

Further, although the head or head module is described as the first member and the holder is described as the second member in the above-described embodiments, the present embodiment is not limited to the head and the head module and can be universally applied to a module or an apparatus in which the first member and the second member are fixed and attached with a screw.

[Aspect 1]

A head (200) includes: an attachment (230) attached to a holder (300) with a screw (400), the attachment (230) having a through hole (231) to which the screw (400) is inserted, and the through hole (231) having: a female screw (232) having a valley and a crest; and a first concave (233) having a diameter larger than a diameter of the valley of the female screw (232), the first concave (233) opening toward the holder (300).

[Aspect 2]

In the head (200) according to Aspect 1, the through hole (231) includes a second concave (234) having a diameter larger than the diameter of the valley of the female screw (232), and the second concave opening toward a side opposite to the holder (300).

[Aspect 3]

In the head (200) according to Aspect 1, the head (200) discharges a liquid.

[Aspect 4]

A head module (100) includes: a holder (300); a head (200) attached to the holder (300); and a screw (400) fixing the head to the holder (300). The head (200) includes: an attachment (230) having a through hole (231) to which the screw (400) is inserted, the through hole (231) includes: a female screw (232) having a valley and a crest; and a first concave (233) having a diameter larger than a diameter of the valley of the female screw (232), the first concave (233) opening toward the holder (300), and the screw (400) includes: a screw head (403); a male screw (402) at a tip of the screw (400); and a shaft (401) between the screw head (403) and the male screw (402) and narrower than a diameter of the crest of the female screw (232).

[Aspect 5]

In the head module (100) according to Aspect 4, the through hole (231) includes a second concave (234) having a diameter larger than the diameter of the valley of the female screw (232), and the second concave opening toward a side opposite to the holder (300).

[Aspect 6]

In the head module (100) according to Aspect 4, a depth (d) of the first concave (233) is deeper than a length (e) of the male screw (402) of the screw (400).

[Aspect 7]

In the head module (100) according to Aspect 4, the holder (300) has a female screw (302), and a shape and a size of the female screw (302) is identical to a shape and a size of the female screw (232) of the head (200).

[Aspect 8]

In the head module (100) according to Aspect 4, the head (200) discharges a liquid.

[Aspect 9]

A liquid discharge apparatus (500) includes the head (200) according to Aspect 3.

[Aspect 10]

A liquid discharge apparatus (500) includes the head module (100) according to Aspect 8.

[Aspect 11]

A printer (500) includes the head (200) according to Aspect 1.

[Aspect 12]

A printer (500) includes the head module according to Aspect 4.

[Aspect 13]

A module (100) includes: a first member (200); a second member (300); and a screw (400) fixing the first member (200) to the second member (300). The first member (200) includes: an attachment (230) having a through hole (231) to which the screw (400) is inserted, the through hole (231) includes: a female screw (232) having a valley and a crest; and a first concave (233) having a diameter larger than a diameter of the valley of the female screw (232), the first concave (233) opening toward the second member (300), and the screw (400) includes: a screw head (403); a male screw (402) at a tip of the screw (400); and a shaft (401) between the screw head (403) and the male screw (402) and narrower than a diameter of the crest of the female screw (232).

[Aspect 14]

An apparatus (500) includes the module according to Aspect 13.

[Aspect 15]

In the head (200) according to Aspect 1, the through hole (231) includes a third concave (235) between the female screw (232) and the first concave (233), and the third concave (235) has a diameter same as the diameter of the valley of the female screw (232).

[Aspect 16]

In the head (200) according to Aspect 1, the through hole (231) includes a fourth concave (236) disposed opposite to a side of the first concave (233) with the female screw (232) in between, and the fourth concave (236) has a diameter same as the diameter of the valley of the female screw (232).

According to the present embodiment, the workability of the attachment work with a screw is improved.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A head comprising:

an attachment attached to a holder with a screw, the attachment having a through hole to which the screw is inserted, and the through hole having a female screw having a valley and a crest, and a first concave part having a diameter larger than a diameter of the valley of the female screw, the first concave part opening toward the holder, wherein the through hole further includes a second concave part between the female screw and the first concave part, and the second concave part has a same diameter as the diameter of the valley of the female screw.

2. The head according to claim 1, wherein the through hole further includes a third concave par; having a diameter larger than the diameter of the valley of the female screw, and the third concave part opening toward a side opposite to the holder.

3. The head according to claim 1, wherein the head discharges a liquid.

4. A liquid discharge apparatus comprising the head according to claim 3.

5. A printer comprising the head according to claim 1.

6. A head comprising:

an attachment attached to a holder with a screw, the attachment having a through hole to which the screw is inserted, and the through hole having a female screw having a valley and a crest, and a first concave part having a diameter larger than a diameter of the valley of the female screw, the first concave part opening toward the holder, wherein the through hole includes a second concave part disposed opposite to a side of the first concave part with the female screw in between the first and second concave parts, and the second concave part has a same diameter as the diameter of the valley of the female screw.

* * * * *